United States Patent [19]
Timbs

[11] Patent Number: 5,878,045
[45] Date of Patent: Mar. 2, 1999

[54] METHOD AND APPARATUS FOR CONVERTING DATA STREAMS IN A CELL BASED COMMUNICATIONS SYSTEM

[75] Inventor: Jeffrey L. Timbs, Keller, Tex.

[73] Assignee: Motorola, Inc., Schaumburg, Ill.

[21] Appl. No.: 638,418

[22] Filed: Apr. 26, 1996

[51] Int. Cl.[6] .................................................. H04L 12/56
[52] U.S. Cl. ........................ 370/466; 370/474; 370/476
[58] Field of Search ...................................... 370/466, 469, 370/471, 474, 476, 419, 353, 401

[56] References Cited

U.S. PATENT DOCUMENTS

| | | |
|---|---|---|
| 5,379,297 | 1/1995 | Glover et al. . |
| 5,402,417 | 3/1995 | Aramaki . |
| 5,408,472 | 4/1995 | Hluchyj et al. . |
| 5,414,704 | 5/1995 | Spinney . |
| 5,420,858 | 5/1995 | Marshall et al. . |
| 5,436,891 | 7/1995 | Grossman et al. . |
| 5,436,892 | 7/1995 | Tago et al. . |
| 5,446,738 | 8/1995 | Kim et al. . |
| 5,541,926 | 7/1996 | Saito et al. ............................. 370/474 |
| 5,548,587 | 8/1996 | Bailey et al. .......................... 370/474 |
| 5,606,552 | 2/1997 | Baldwin et al. ....................... 370/474 |
| 5,606,558 | 2/1997 | Daniel et al. ......................... 370/474 |
| 5,610,921 | 3/1997 | Christensen .......................... 370/474 |
| 5,623,491 | 4/1997 | Skoog ................................... 370/466 |
| 5,625,625 | 4/1997 | Oskouy et al. ....................... 370/474 |
| 5,638,364 | 6/1997 | Sugita ................................... 370/474 |

*Primary Examiner*—Min Jung
*Attorney, Agent, or Firm*—James A. Coffing; Bruce Terry

[57] ABSTRACT

A frame to cell converter (413) uses a process for converting a data transmission stream for transportation in a cell-based network (102). The frame to cell converter (413) receives a data transmission stream from a data source to produce a received data transmission stream. The received data transmission stream may be either a synchronous data stream or an asynchronous data stream. An address translation is performed based on the data source to produce a unique address identifier. The unique address identifier and a portion of the received data transmission stream are employed to create an ATM cell (238) for transportation within the cell-based network (102).

22 Claims, 8 Drawing Sheets

METHOD AND APPARATUS FOR CONVERTING DATA STREAMS IN A CELL BASED COMMUNICATIONS SYSTEM

FIELD OF THE INVENTION

The present invention relates generally to a communications system, and in particular, to a method and apparatus for receiving data in the communications system. Still more particularly, the present invention relates to a method and apparatus for converting a data transmission stream into cells for transportation in a cell-based network.

BACKGROUND OF THE INVENTION

In presently available communications systems, the use of asynchronous transmission mode (ATM) technology is becoming a method of choice. In particular, ATM cells are used within telecommunications switching networks and may carry a wide variety of traffic types from different applications such as data, voice, image, and video. Furthermore, the use of CDMA for wireless communications systems is becoming a method of choice for data and voice transport due to its inherent variable rate traffic channel frame organization. The influence of variable-length packet transport inherent to CDMA and fixed-length cell-switching inherent to ATM requires efficient conversion techniques at the interface between the wireless transport and the switching network. In the conversion of data streams into ATM cells, the presently available systems focus around transporting CDMA speech packets via variable rate packets utilizing off-the-shelf segmentation and reassembly (SAR) devices, or data optimized conversion devices, yielding a more complex and costly implementation. Additionally, presently available systems provide for segmentation and reassembly (SAR) of packets in which large packet data units (PDUs) are converted into ATM cells for transport within a cell-based switching network. In converting large PDUs into ATM cells, expensive host memory and wide buses such as PCI-based architecture are required, thereby increasing the cost and preventing efficient transport of voice data within the cell-based switching network.

Existing commercial off-the-shelf SAR devices are available to perform constant-bit-rate (CBR) and/or variable-bit-rate (VBR) traffic to ATM cell conversion. SAR involves chopping packets into cells and reassembling them for multiple receive cells to form a single large packet. More information on off-the-shelf SAR devices may be found in IgT AAL 5 SAR Processor, WAC-020-A; Data Sheet, Motorola SPS ATM AAL SAR Controller With Framer, MC92516; Data Sheet, TI SAR Device with PCI Host Interface, TNETA1562; Data Sheet, TI SAR Device with Integrated 64-bit PCI Host Interface; and, TNETA1570: Data Sheet. However, these devices were developed for desktop applications and are primarily intended to handle data (i.e., non-voice) information. Furthermore, as a result of the intended application, most devices must operate within a PCI-bus environment, relying upon either an integrated or external controller and wide host-memory. Also, in order to expand the range of applications in which these devices may operate, embedded firmware is typically used to perform a specific ATM adaptation layer (AAL) conversion. Therefore, the AAL may be changed by downloading and enabling new firmware. However, the dependence upon firmware to process differing AALs, as well as upon PCI architectures for interacting with computer-based peripheral devices, along with the inability to perform per-VC mixed mode AALs (e.g., AAL 1 or AAL 5 simultaneous on various VC) limits the usefulness of such devices in voice applications. More information on PCI architecture may be found in PCI Local Bus Specification, Rev 2.0, PCI Special Interest Group, Hillsboro, Oreg., or *PCI System Design Guide, Rev* 1.0, PCI Special Interest Group, Hillsboro, Oreg.

In particular, PCS systems employing the CDMA air-interface utilize variable-rate speech codecs to efficiently utilize the frequency spectrum and to minimize cross-interference among other simultaneous users. Two methods are commonly known in the art for back hauling downconverted and digitized data from a base termination site (BTS) to a transcoder for conversion into a format compatible with the public switch telephone network (PSTN). Since the BTSs are located at separate locations from the central base site controller (CBSC ), separate point-to-point span line interfaces are typically provided between the BTS and the CBSC for backhaul. Backhaul relates to the mapping of information frames onto physical media (e.g., electrical or optical) for transport between the CBSC and the BTSs. Network operators seek to minimize backhaul costs associated with the physical access plant containing the physical connections in a communications system. Different techniques are utilized to achieve this operating efficiency, such as attaining higher utilization (i.e., transport of more calls) on the same fabric. A synchronous backhaul approach may be utilized whereby the variable-rate voice packet is segmented into one or two bit subslots and sent via a 16-kbps synchronous channel via either a T1 or E1 span line. More information on this approach may be found in TIA TR46 Ad-Hoc Group, "Voice Frame Format" by Karl Lewis of Motorola, Aug. 28, 1995. The CDMA air-frame is converted into a synchronous, constant-bit size packet, consisting of 320 bits that are sent at 2 bits/125 microsecond frame over 160 frames.

The synchronous backhaul approach utilizes a 320-bit fixed-length packet that contains the CDMA voice data, synchronization information, and other overhead. By contrast, the asynchronous backhaul approach utilizes variable-sized packets ranging from 13 to 36 bytes plus overhead. The appropriate AAL technique for carrying variable rate data is AAL 5. The AAL 5 method may support packets sizes ranging from 0 to 64 k octets by segmenting each packet into smaller sized groupings for encapsulation within an ATM cell payload. The final cell utilizes 8 octets of the 48-octet payload for AAL 5-specific information. However, observation of the data format present within a CDMA air-frame for ⅛; ¼; ½; and full rate speech shows that the entire air-frame may be encapsulated within a single AAL 5-formatted ATM cell payload even with the fixed synchronous (320-bit or 40-bytes) format.

A second backhaul approach may be utilized whereby the variable-sized packet is encapsulated in an asynchronous packet format (frame relay, FUNI, etc.) and sent via a frame format via either a T1 or E1 span line. The advantage of the asynchronous backhaul technique over the synchronous backhaul technique is that the available bandwidth is used more efficiently since only relevant information is sent per packet transfer (e.g., only 80 plus 24 bits in the asynchronous data stream versus a fixed 320 bits for the smallest packet size in the synchronous data stream). The asynchronous interface will partially utilize a single AAL 5-formatted ATM cell payload (occupying from 8 to 24-bytes plus overhead). Thus, more subscribers/calls may be transported over the same span line than may be supported by the synchronous approach. However, the advantage of the synchronous backhaul technique over the asynchronous backhaul technique is that processing is simplified since the creation of each call is known and fixed in every frame interval, independent of the number of in-progress calls. Furthermore, the synchronous backhaul technique is compatible with the more prevalent circuit switching network topology widely deployed today. As ATM cell-switching experiences rapid growth, an efficient solution must be provided to realize the bandwidth efficiencies of newer asynchronous/packet backhaul while insuring backward compatibility with presently used synchronous backhaul in personal communication system (PCS)/CDMA communications system. In either case (synchronous or asynchronous), the data is optimally transferred within the CBSC utilizing a cell switching system. Therefore, the packet must be converted into an ATM cell utilizing the appropriate ATM adaptation layer (AAL) technique.

Currently, the most prevalent method of transporting data between the BTS and the CBSC is via the synchronous backhaul approach. However, frame-based (asynchronous) backhaul approaches promise better utilization of the backhaul transmission fabric since it utilizes only the amount of bandwidth required rather than a fixed amount of bandwidth, regardless of the amount occupied (as required by the synchronous backhaul approach). The introduction of the asynchronous-based backhaul is dependent upon an efficient method of switching packets within the CBSC. As the CBSC switching technology advances from circuit-switching to cell-switching, the PCS network will contain a significant portion of earlier deployed synchronous BTSs that must continue to be supported by the CBSC. Moreover, due to the physically distributed nature of BTSs (relative to CBSCs), the upgrade/modification process tends to be expensive. Therefore, the CBSC must efficiently convert either synchronous or asynchronous backhaul formats into ATM cells for intra-CBSC transport.

Accordingly, it would be advantageous to have an improved method and apparatus for converting data streams into cells. It also would be advantageous to have a method and apparatus that efficiently processes both synchronous and asynchronous data streams for use in a cell-based network.

DETAILED DESCRIPTION OF A PREFERRED EMBODIMENT

The present invention provides a method and apparatus for converting a data transmission stream for transportation within a cell-based network. In particular, the present invention provides a method and apparatus for converting both asynchronous data streams and synchronous data streams into cells prior to entering a cell-based network using optimized hardware for processing these two types of data streams. In addition, address translations are performed to produce a unique identifier that is processed with a portion of the received data to create a data cell unit for transportation within the cell-based network. The present invention provides a frame to cell converter that processes both synchronous and asynchronous data for use in a central base site controller (CBSC) implementing a cell-based switching system. Further, the present invention provides a frame to cell converter for converting both asynchronous and synchronous data streams into an ATM cell, utilizing the appropriate AAL technique according to a preferred embodiment of the present invention.

Figure 1:
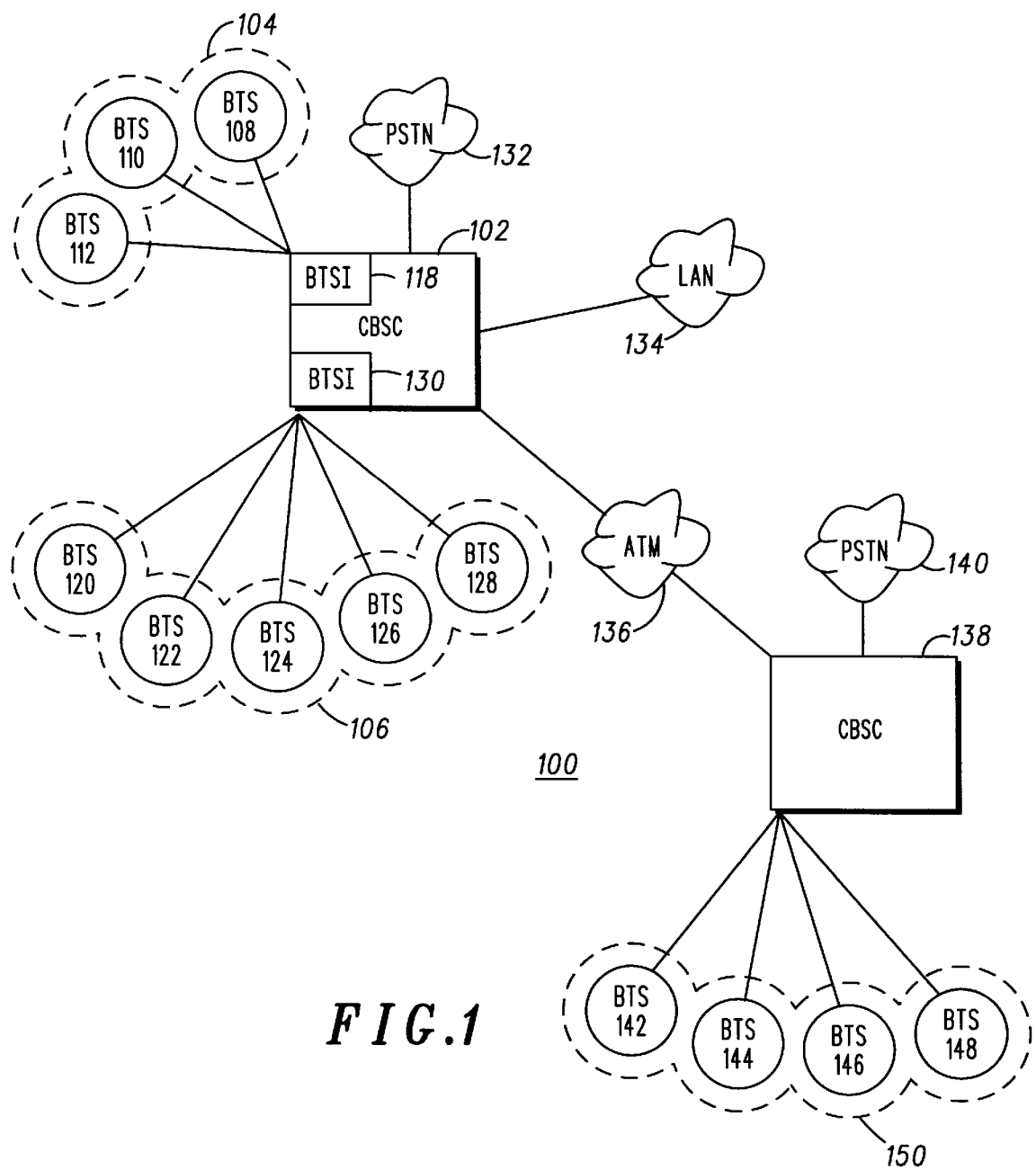
FIG. 1 is a diagram of a communications system according to the present invention.

With reference now to FIG. 1, a communications system 100 is depicted in which the present invention may be implemented. Communications system 100 includes a CBSC 102, which in the depicted example, is a cell-based network providing switching functions for processing traffic from various sources such as voice, data, image, and video sources. CBSC 102 provides cell-switching instead of circuit switching in accordance with a preferred embodiment of the present invention. CBSC 102 receives and sends data to and from cellular regions 104 and 106. Cellular region 104 includes base termination sites (BTSs) 108–112, which send and receive radio signals to and from mobile telephones and packetize the communications content of the radio signals into electronic data that is transported in data packets to base termination site interface (BTSI) 118 for transport within CBSC 102. These radio signals may be CDMA signals according to a preferred embodiment of the present invention. Similarly, BTSs 120–128 in cellular region 106 also send and receive radio signals to and from mobile telephones. The received radio signals are packetized into electronic packet data units (PDUs), or alternatively, the PDUs may be further segmented, depending on whether the span line is synchronous or asynchronous, and then transported to BTSI 130 via span lines connecting BTSs 120–128 to BTSI 130. These span lines may be T1 or E1 lines. (It should be noted that the data streams of PDUs entering CBSC 102 are considered uplink data streams, while data streams exiting CBSC 102 are considered downlink data streams.) At BTSI 118 and BTSI 130, the PDUs are converted into ATM cells that are sent through the CBSC 102 and then converted into an appropriate format for the various destinations such as public switch telephone network (PSTN) 132, local area network (LAN) 134, or to an ATM network 136 for further transmission to CBSC 138, which is connected to the PSTN 140 and BTSs 142–148 in cellular region 150. More information on ATM technology may be found in Goralski, *Introduction to ATM Networking*, McGraw-Hill, Inc., (1995), ISBN 0-07-024043-4.

Figure 2:
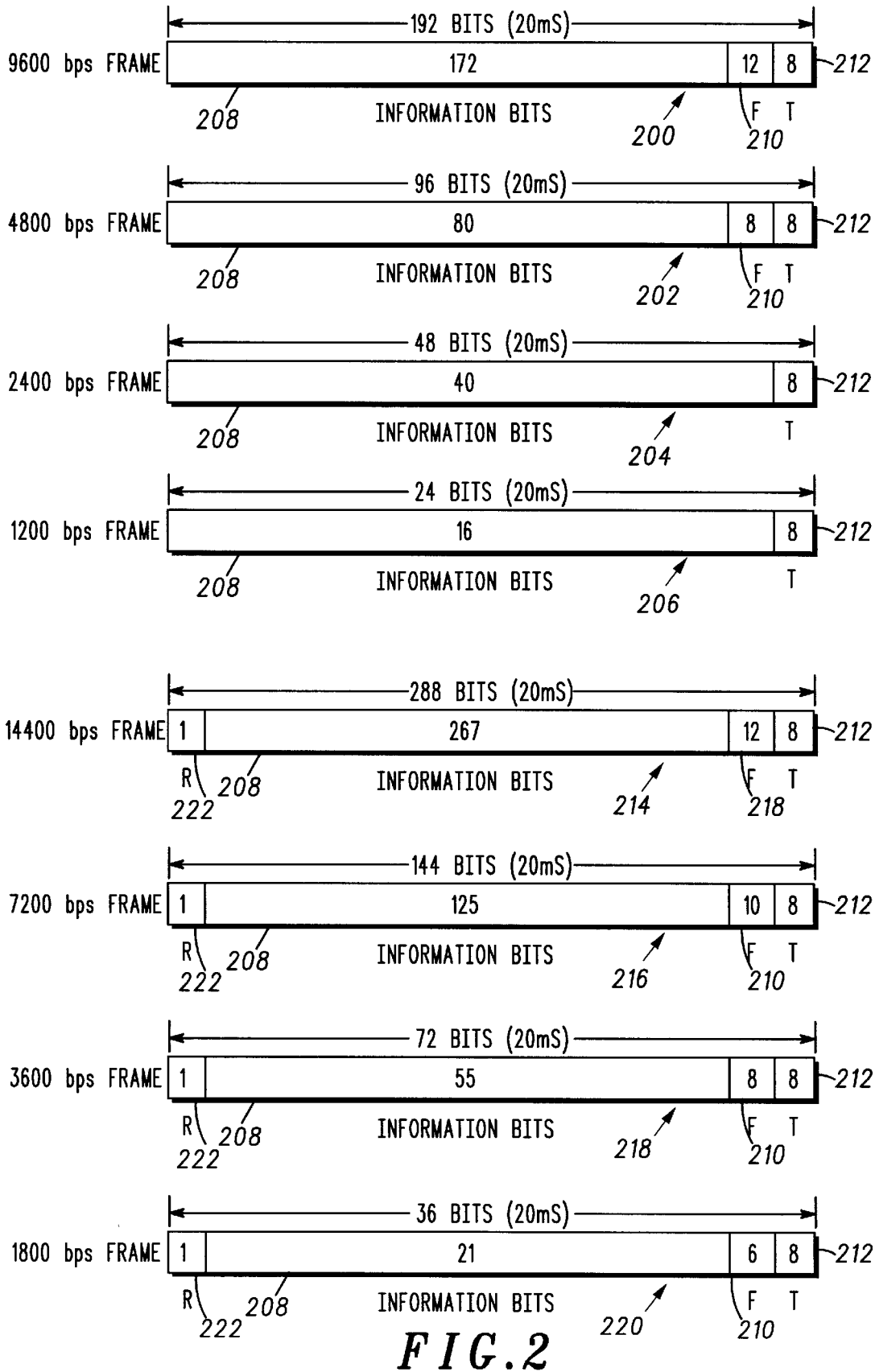
FIG. 2 is a diagram of channel frame structures according to the present invention.

With reference now to FIG. 2, a diagram of traffic channel frame structures in accordance with the present invention is depicted. Frames 200, 202, 204, and 206 are 9600 bits per second (bps), 4800 bps, 2400 bps, and 1200 bps frames, respectively. Each of these frames contains 192 bits to 24 bits of data and occupies 20 milliseconds of time. All of the frames include an information bits field 208, with frames 200 and 202 including a frame quality indicator (F) field 210 and an encoder tail bits (T) field 212. Frames 204 and 206 only contain information bits field 208 and encoder tail bits field 212. Frames 214, 216, 218, and 220 are 14400 bps, 7200 bps, 3600 bps, and 1800 bps frames, respectively. As with frames 200 and 202, each of the frames includes information bits field 208, F field 210, and T field 212. Additionally, these frames also contain a reserved bit (R) field 222. More information on frames and the CDMA standard can be found in Mobile Station-Base Station Capability Standard for Dual-Mode Wideband Spread Spectrum Cellular System, *TIA/EIA Interim Standard*, IS-95, July 1993. The numbers depicted in the fields indicate the number of bits, unless noted otherwise. Additionally, in the depicted examples, the same reference numerals are used to identify similar fields and components in different figures. According to the invention, the frame structures depicted in FIG. 2 are mapped, or converted, to cells at a BTSI, as later described.

Figure 3:
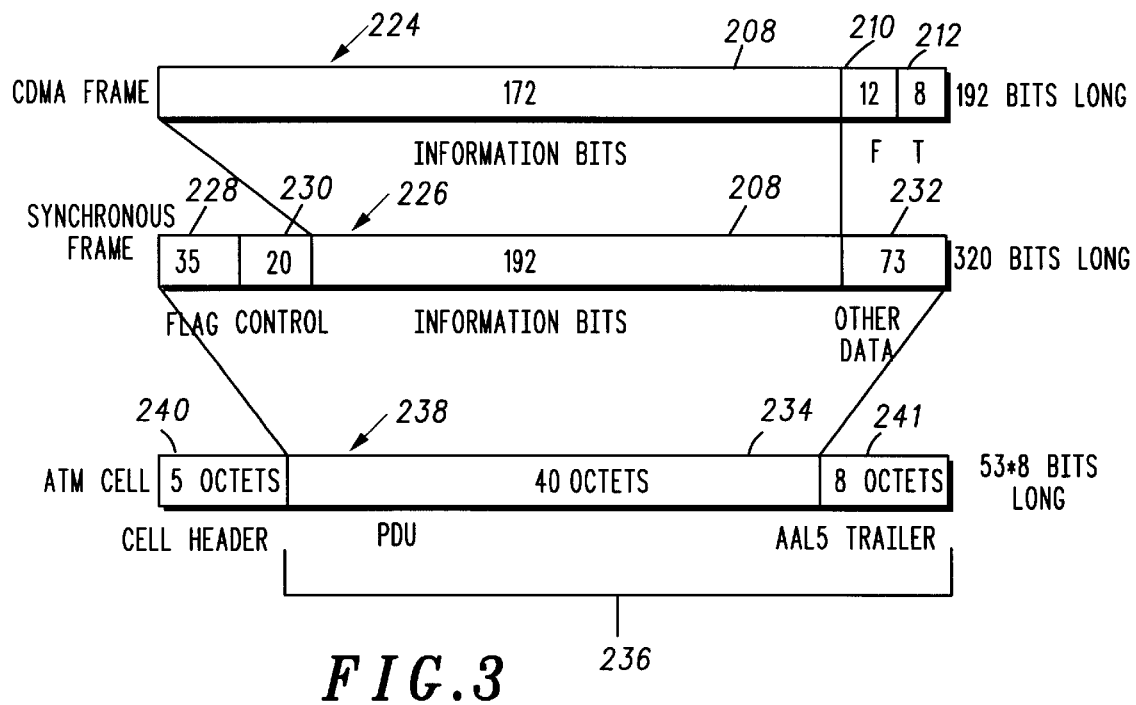
FIG. 3 is a diagram illustrating the mapping of a CDMA frame into an ATM cell according to the present invention

With reference now to FIG. 3, a diagram illustrating the mapping of a CDMA frame into an ATM cell is depicted according to the present invention. CDMA frame 224 includes information bits field 208. Information bits field 208 in CDMA frame 224 are mapped into information bits field 208 of synchronous frame 226. Synchronous frame 226 also includes a flag field 228, a control field 230, and an other data field 232. Synchronous frame 226 is then mapped into a packet data unit (PDU) field 234 within payload 236 of an ATM cell 238 before AAL 5 trailer field 241. ATM cell 238 also includes a cell header field$_{13}$ 240, as shown.

Figure 4:
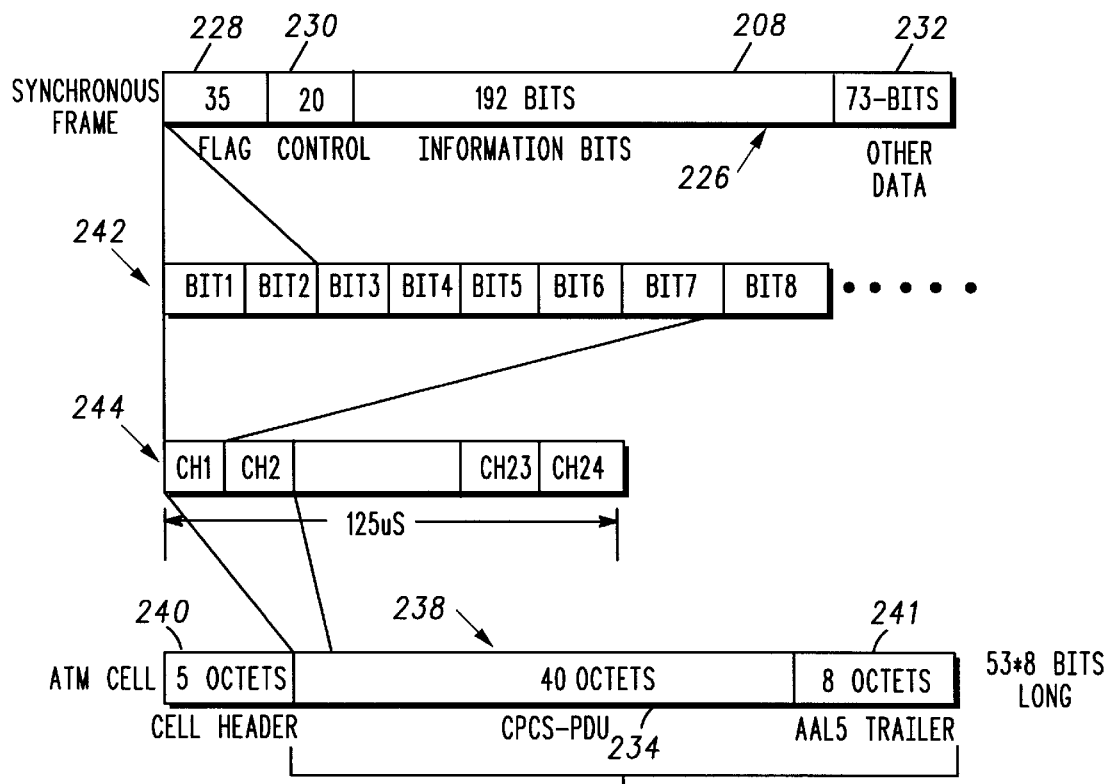
FIG. 4 is a diagram of an actual physical layer mapping of a frame into an asynchronous span line interface according to the present invention.

With reference now to FIG. 4, a diagram of an actual physical layer mapping of a frame into an asynchronous span line interface is depicted according to the present invention. Synchronous frame 226 is mapped into subslots 242, two bits at a time, according to the present invention. In other words, synchronous frame 226 is multiplexed into 16 kbps subslots in a DS0 channel. Each DS0 channel is multiplexed into channels 244 (e.g., one of 24 channels of a 1.544 Mbps T1 or one of 32 channels of a 2.048 Mbps E1). In accordance with a preferred embodiment of the invention, 160 frames are used to transfer data from the BTS to the BTSI using a synchronous span line interface. Each channel is buffered and multiplexed into PDU field 234 of payload 236 within ATM cell 238 along with an AAL 5 trailer 241. The span line is synchronous because the T1/E1 in each DS0 repeats every 125 ms. More information on synchronous frames may be found in Lewis, Voice Frame Format, presented at Telecommunications Industry Association, TR46 Ad-Hoc Group, Monterey Calif., Aug. 28–Sep. 1, 1995.

Figure 5:
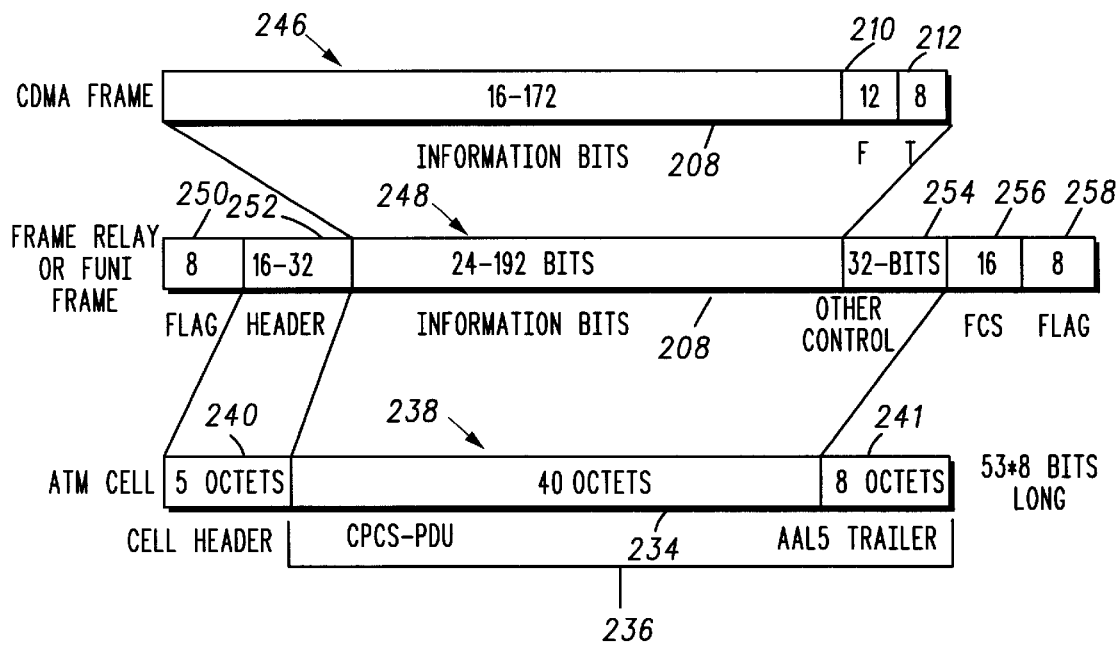
FIG. 5 is a diagram illustrating the mapping of a CDMA frame into a cell according to the present invention.

With reference now to FIG. 5, a diagram illustrating the mapping of a CDMA frame into an ATM cell is depicted according to the present invention. CDMA frame 246 is mapped into information bits field 208 in frame 248, which may be either a frame relay or a FUNI frame in accordance with a preferred embodiment of the present invention. More information on FUNI is found in Frame Based User-to-Network Interface (FUNI) Specifications, af-saa-0030.000, available from the ATM Forum Technical Committee, Foster City, Calif. More information on frame relay may be found in Kumar, *Broadband Communications, A Professional's Guide to ATM, Frame Relay, SMDS, SONET, and B-ISDN*, McGraw-*Hill, Inc.*, 1995. Frame 248 includes a flag field 250, a header field 252, an other control field 254, a frame control section (FCS) field 256, and a flag field 258. Header field 252 is mapped into cell header field 240 of ATM cell 238. Information bits 208 and other control bits 254 are mapped into PDU section 234 of payload 236. In a preferred embodiment, variable link packet sizes are mapped with PDU mapping into an ATM payload and cell header. That is, the frame address (in a FUNI frame) or the data link connection identifier (DLCI, in the frame relay frame) is mapped indirectly into an ATM virtual path identifier (VPI) and virtual channel identifier (VCI) in the cell header.

Figure 6:
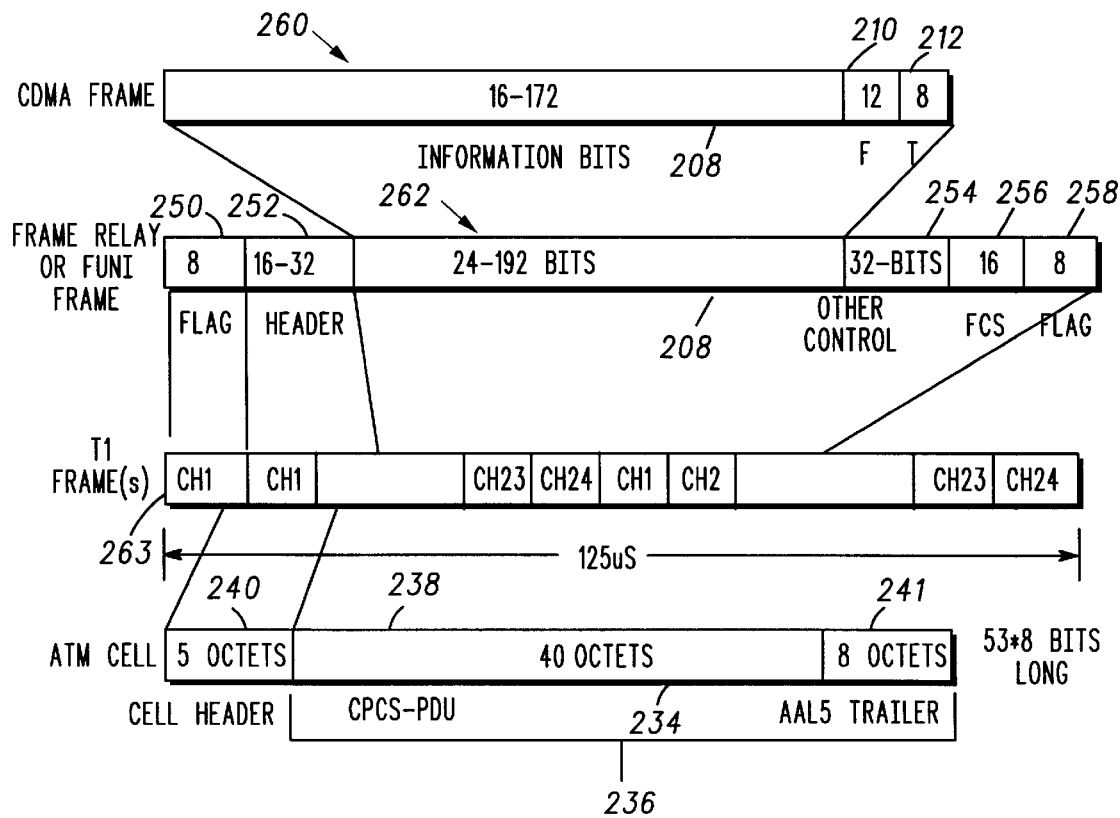
FIG. 6 is a diagram illustrating mapping of asynchronous data into a span line interface according to the present invention.

With reference now to FIG. 6, a diagram illustrating mapping of asynchronous data into a span line interface is depicted according to the present invention. Information bits field 208 in CDMA frame 260 is mapped into the information bits field 208 of a frame relay or a FUNI frame 262, with frame 262 being mapped into T1 frames 263 in a series of channels (e.g., channels 1–24) the correct portions of the channels are mapped into cell header 240 of a ATM cell 238 and the remaining portion of the T1 frames 263 being mapped into the PDU field 234 of ATM cell 238. The difference between the synchronous version and the asynchronous version shown in this diagram is that the entire packet/frame is sent contiguously from the BTS to the BTSI over the span line interface. In other words, a packet can use the full bandwidth of the span line (e.g., 1.544 Mbps or 2.048 Mbps) rather than only a portion of it (e.g., 16 Kbps) as in the synchronous data stream. As a result, less latency is experienced in transferring the packet from the BTS to the CBSC in accordance with a preferred embodiment of the present invention.

Figure 7:
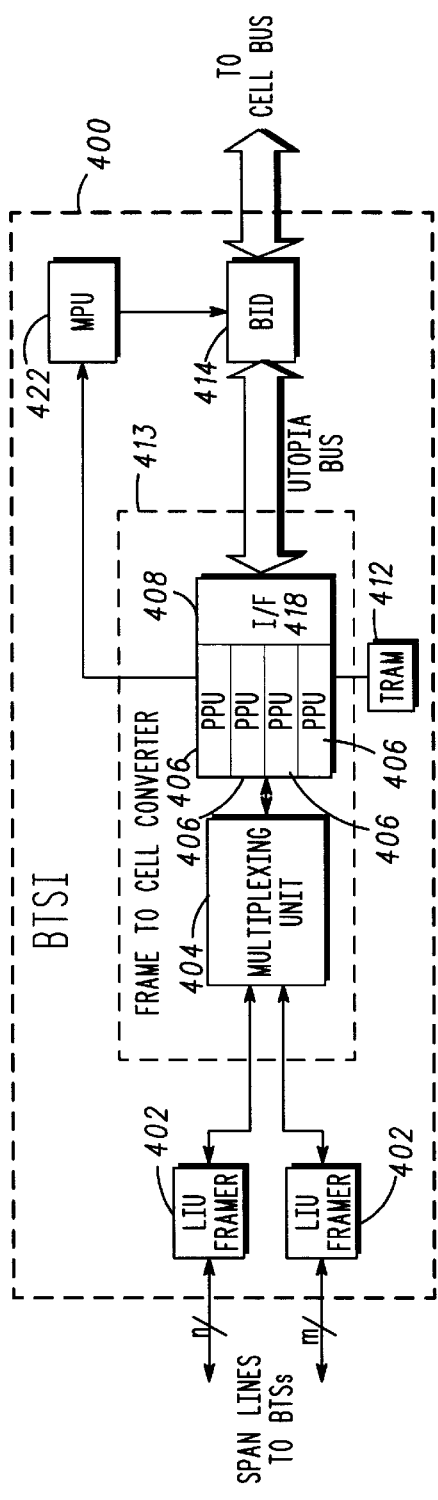
FIG. 7 is a block diagram of a BTSI according to the present invention.

With reference now to FIG. 7, a block diagram of a BTSI is depicted according to the present invention. As shown, BTSI 400 contains line interface unit (LIU) framers 402 used to receive and process frames and multiplexing unit 404. Each LIU framer is connected to n and m number of span lines, respectively. The LIU framers are used to remove PDUs from the physical span line connecting the frame to cell converter to a BTS. These devices are well known in the art. For example, a T7630 T1/E1 framer is available from AT&T Corp, and PM4344 is a framer available from PMC-Sierra located in Burnaby, Canada. The PDUs are sent to multiplexing unit 404, which serves to de-multiplex packets from multiple span lines, arriving synchronously with respect to each other. Multiplexing unit 404 also checks the packet length, removes the payload, and verifies that the packet was transmitted error free via packet trailer processing. Error free packets are then passed to packet processing units (PPUs) 406 within packet processing engine 408. Only error free packets are passed from multiplexing unit 404 to the PPUs to prevent wasting resources on bad packets and to avoid degrading capacity with bad packets.

Multiplexing unit 404, packet processing engine 408, and interface block 418 form a frame to cell converter 413 in accordance with a preferred embodiment of the present invention. Frame to cell converter 413 provides an improved system for handling both synchronous data streams and asynchronous data streams by providing common hardware to process both types of streams from different span lines in accordance with a preferred embodiment of the present invention.

Additionally, multiplexing unit 404 tags or associates the data from the packet payload with the received STRAU and a three bit link identifier specifying the span line number from which the PDU was received. The data from the packet payload is sent to one of the PPUs in packet processing engine 408, along with the DLCI address tag and the span line identifier. The PPU then performs first-end address translation, called a "level one" address translation, as part of the AAL 5 translation process. This level one address translation is employed to append a VPI address and a VCI address to the ATM cell header related to the particular channel number. According to the present invention, the span line number identifier forms the three least significant bits of the VPI and the DLCI is used for the eight least significant bits of the VCI field. Alternatively, the DLCI may be used to obtain the VCI either directly or indirectly via a look-up table.

While address translation occurs, the data from the packet payload is processed to extract information from the AAL 5 trailer. In particular, the packet length is checked and a CRC-32 is calculated over the payload according to the AAL 5 conversion process. These conversions are performed using translational random access memory (TRAM) 412. The address translation is used to obtain a unique identifier for the cell header. An indication also is made within the packet trailer as to whether the current packet corresponds to a call that is in a soft-hand-off (SHO) mode placed in a CPC-UU field (not shown). This indication is later used by the transcoder card to align multiple cells arriving at the CBSC over different port interfaces and traversing the CBSC via different routes to the same transcoder. After the ATM cells have been processed, they are passed from the packet processing units 406 to interface block (I/F) 418 within packet processing engine 408. Interface block 418 is connected to bus interface device (BID) 414 by a UTOPIA bus. More information on UTOPIA buses may be found in Utopia Level 2, V1.0, af-phy-0039.000, available from the ATM Forum Technical Committee in Foster City, California. Interface block 418 passes the ATM cells to BID 414, which is employed to place the ATM cells on a cell bus to be routed within CBSC 102 to a destination node, such as a transcoder card. In the depicted example, the BIDs are implemented using Cubits from TranSwitch Corporation in Shelton, Conn. "Cubit" is a trademark of TranSwitch Corporation. More information on Cubits and their applications may be found in Cell Bus, Technical Manual and Cubit Applications, Document No. TXC-05801-TM1 available from TranSwitch Corporation. Additional information on Cubit devices may be found in Cubit Device, Cell Bus Switch, Data Sheet, Document No. TXC-05801-MB, also available from TranSwitch Corporation.

In the downlink direction, ATM cells containing data arrive from a remote transcoder via the cell bus and are removed by BID 414. Then, the ATM cells are transferred to interface block 418. A determination is made as to which PPU is to process a cell with reference to the destination span line, and the cell is routed to the appropriate PPU. A PPU receiving an ATM cell removes the VCI and performs an address translation to extract a DLCI address and a span line termination number from the ten least significant bits and the three most significant bits, respectively. Alternatively, the VCI may be used to obtain the DLCI either directly or indirectly via a look-up table in accordance with a preferred embodiment of the present invention. Alternatively, the DLCI may be used to obtain the VCI either directly or indirectly via a look-up table. The VPI also may be checked to verify the cell is correctly routed.

During address translation, the AAL 5 trailer in the ATM cell is checked by detecting the PDU link, performing a CRC check over the payload, and comparing the value with the received CRC in the at least four significant octets of the cell payload. If the ATM cell is valid, the cell is converted into a packet subslot and sent to multiplexing unit 404, which multiplexing unit 404 sends the PDU to the appropriate LIU framer 402. If the cell is received in error, the cell is dropped with the PPU resources being reset and an indication of the error being stored in memory, such as in TRAM 412. At multiplexing unit 404, a valid ATM cell results in the data stored in the payload, the DLCI, and the span line number being accepted by the multiplexing unit 404. Multiplexing unit 404 then adds the required packet trailer to form a PDU, with the PDU then being buffered for multiplexing onto one of the LIU framers 402. More information on frame relay processes may be found in ITU Specification Q.921.

According to a preferred embodiment of the present invention, PPUs 406 within packet processing engine 408 provide an efficient method and apparatus for converting packet data units (PDUs) from frames in synchronous and asynchronous data streams into cells. Packet processing engine 408 provides common hardware for processing different types of data streams in accordance with a preferred embodiment of the present invention.

Figure 8:
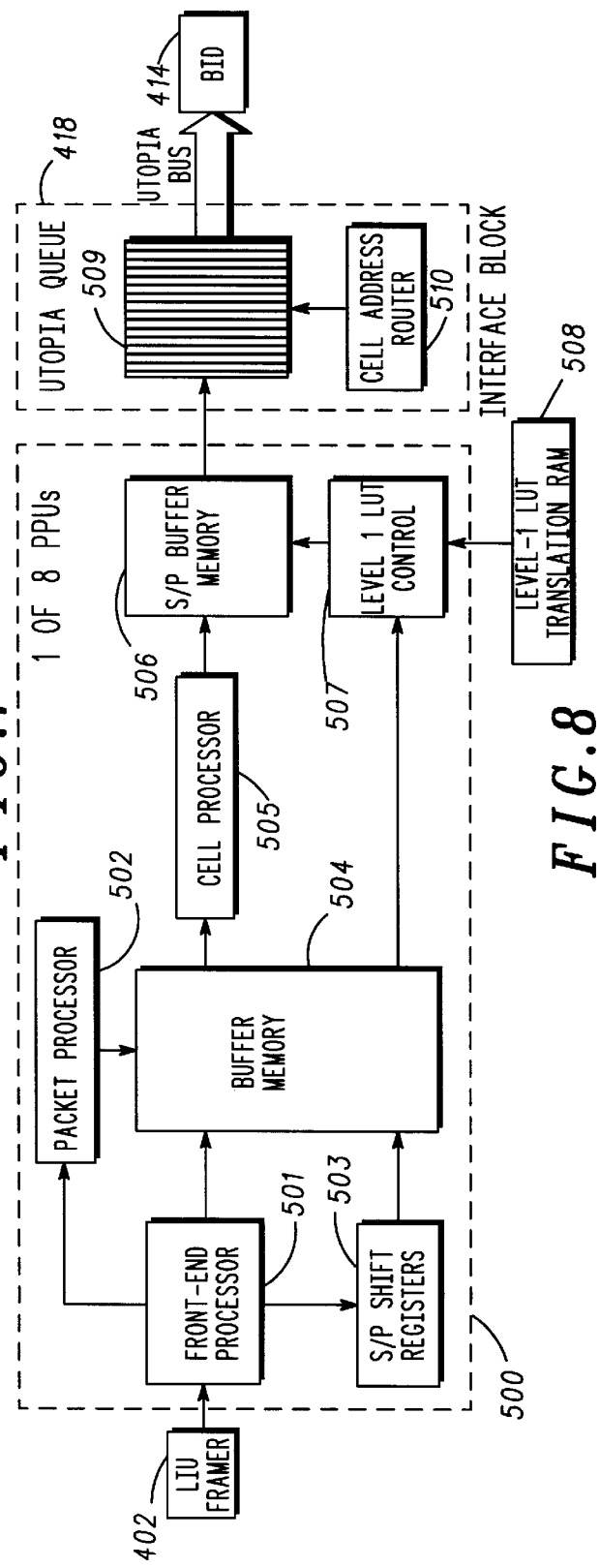
FIG. 8 is a block diagram of a packet processing unit (PPU) used in processing synchronous and asynchronous uplink data streams according to the present invention.
Figure 9:
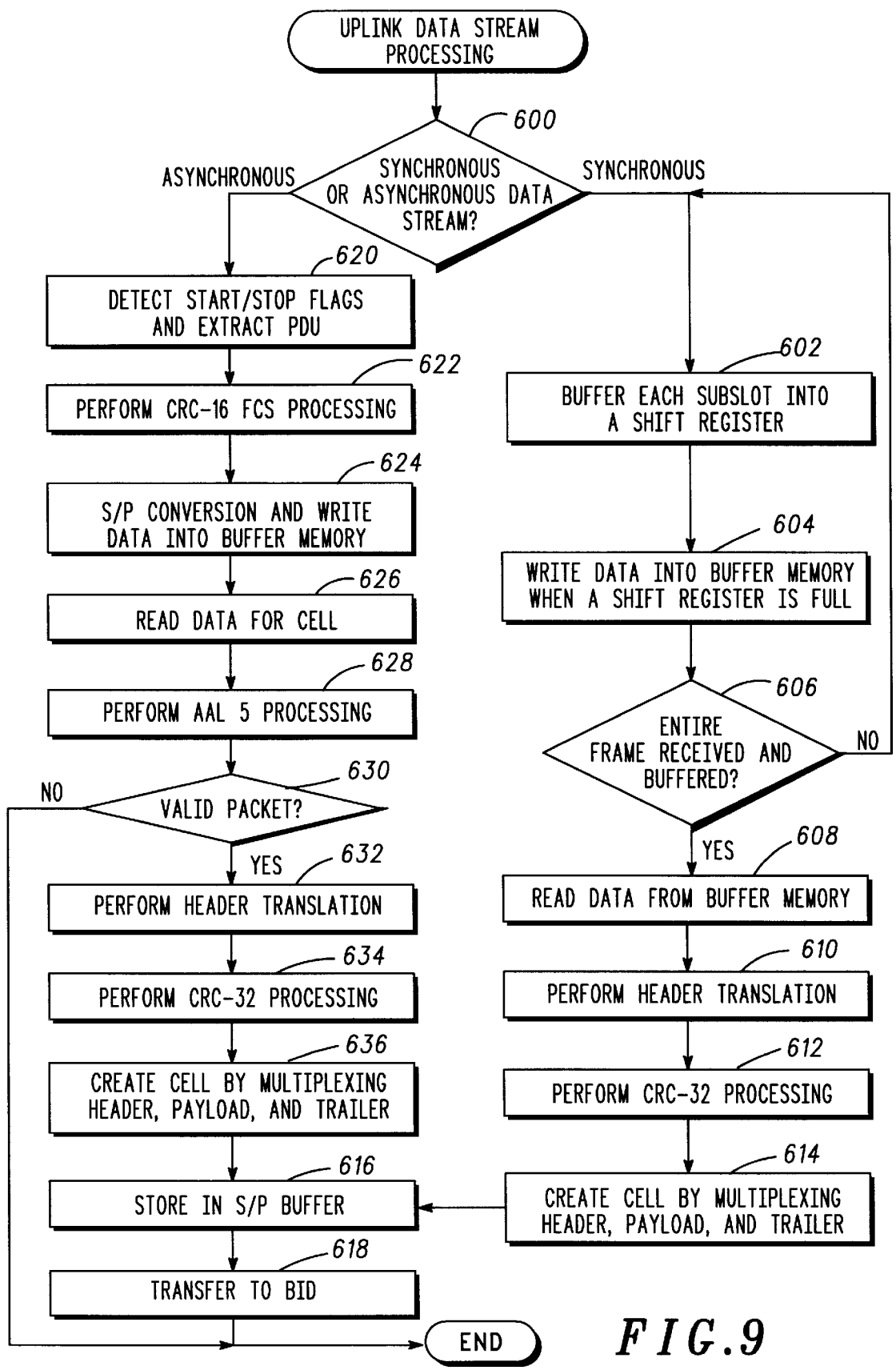
FIG. 9 is a flowchart depicting synchronous and asynchronous uplink data stream processing by a frame to cell converter according to the present invention.
Figure 10:
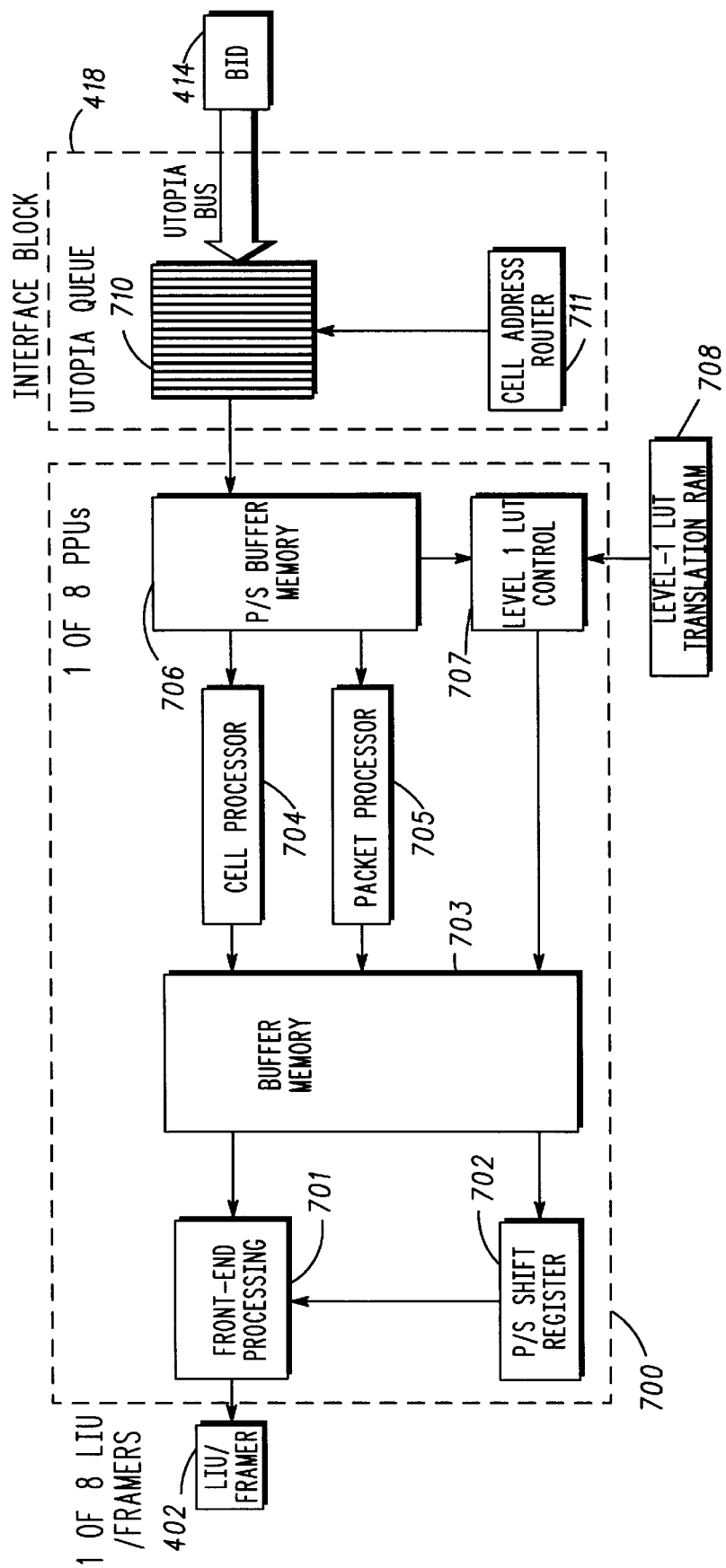
FIG. 10 is a block diagram of a packet processing unit for processing cells for transmission in synchronous and asynchronous data streams according to the present invention.
Figure 11:
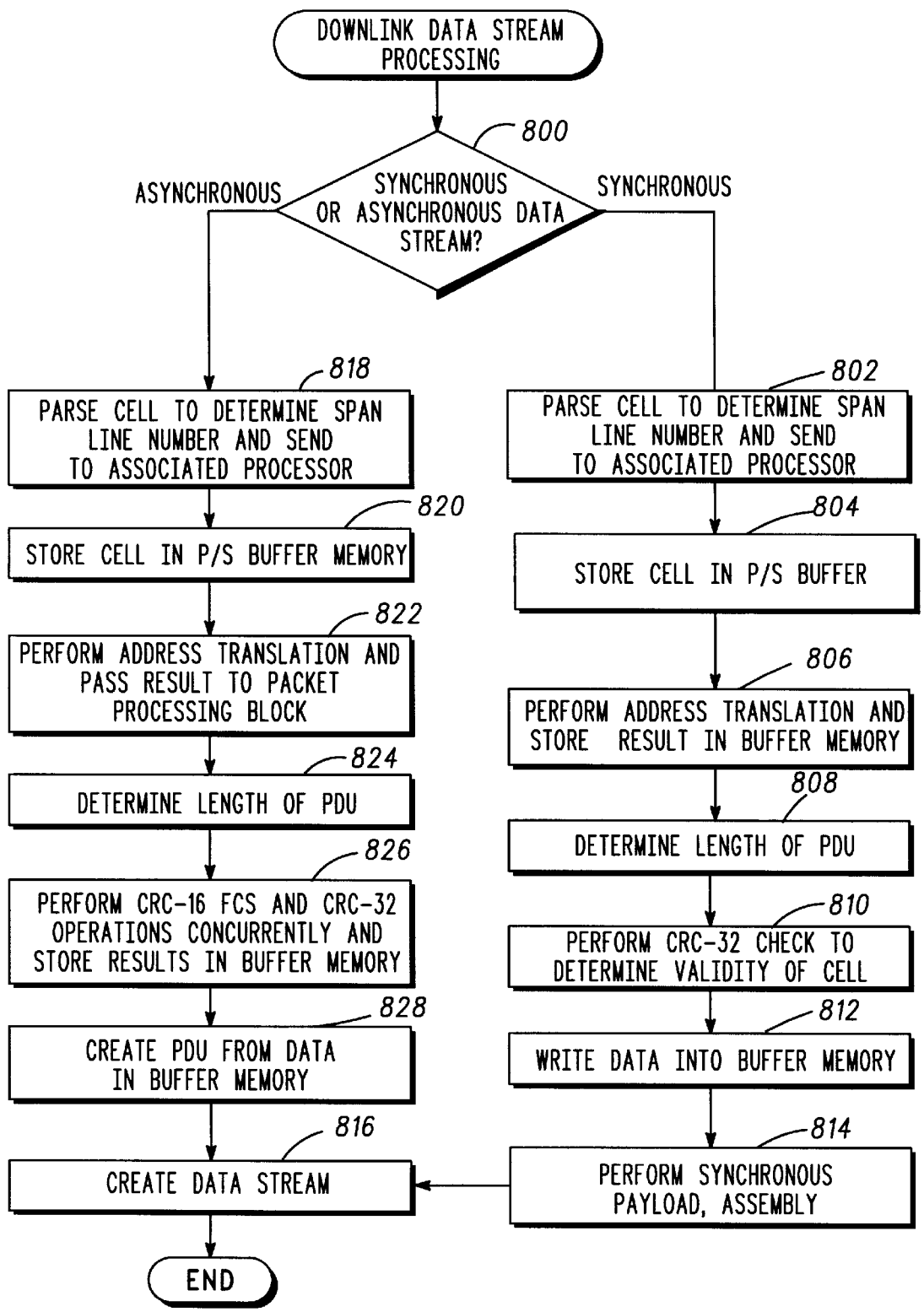
FIG. 11 is a flowchart depicting synchronous and asynchronous downlink data stream processing by a frame to cell converter according to the present invention.

With reference to FIGS. 8 and 10, block diagrams of a packet processing unit (PPU) are depicted in accordance with a preferred embodiment of the present invention. FIG. 8 depicts an uplink unit in a PPU containing the components used to process uplink synchronous and asynchronous data streams, while FIG. 10 illustrates a downlink unit in the same PPU containing the components used to process downlink synchronous and asynchronous data streams. The components shown in FIGS. 8 and 10 are all found in each PPU 406 in FIG. 7. Thus, each PPU 406 provides an improved apparatus for processing synchronous and asynchronous data streams moving in both uplink and downlink directions in accordance with a preferred embodiment of the present invention. FIGS. 9 and 11 are flowcharts of processes followed by a PPU in processing both synchronous and asynchronous data streams in accordance with a preferred embodiment of the present invention.

With reference now to FIG. 8, a block diagram of uplink components in a packet processing unit (PPU) used in processing synchronous and asynchronous uplink data streams is illustrated according to the present invention. PPU 500 is one of a number of PPUs connected to interface block 418 in FIG. 7, which is in turn connected to BID 414 in FIG. 7. Interface block 418 includes a buffer 509 used to store cells prior to being sent to BID 414 and a cell address router 510, which is employed to route cells based on a VPI and a VCI. Turning back to PPU 500, front-end processor 501 has a connection to T1/E1 lines through LIU/framers 402 via multiplexing unit 404 (not shown) and is provisioned to recognize whether the format of T1/E1 is synchronous or asynchronous in accordance with a preferred embodiment of the present invention. Each PPU has a connection to the LIU/framers via multiplexing unit 404 in FIG. 7 in accordance with a preferred embodiment of the present invention. Front-end processor 501 also sends control and data signals to the packet processor 502, which performs a CRC-16 check and disassembles the packet. CRC-16 checks are implemented utilizing ITU Standard Q.920/921 in accordance with a preferred embodiment of the present invention. Serial to parallel (S/P) shift registers 503, also referred to as a "shift register unit", store synchronous data and transfer data to buffer memory 504. A shift register within S/P shift registers 503 is dedicated for each sub-channel, also called a "sub-rate circuit", and sub-rate circuit identifiers (SCI) are used to identify sub-channels. More information on SCIs are found in Lewis, Voice Frame Format, presented at Telecommunications Industry Association, TR46 Ad-Hoc Group, Monterey Calif., Aug.

28–Sep. 1, 1995. It should be noted that S/P shift registers 503 are not used for asynchronous data. Shift registers 503 may be implemented using a memory or other known shift register circuits in accordance with a preferred embodiment of the present invention. Buffer memory 504 also stores the results from packet processor 502.

Cell processor 505 is employed to create cells from the data stored in buffer memory 504, including CRC-32 processing in accordance with a preferred embodiment of the present invention. Cell processor 505 also forms an AAL 5 trailer through CRC-32 processing, in accordance with a preferred embodiment of the present invention. CRC-32 processing and AAL 5 trailer formation is implemented using ITU specification I.363, in accordance with a preferred embodiment of the present invention. In particular, cell processor 505 will perform an address translation to relate the origin of the data stream to a VPI and a VCI using level one look-up table (LUT) control block 507 to access data in level one LUT translation RAM 508 to produce a unique address identifier in accordance with a preferred embodiment of the present invention. When the data stream is an asynchronous data stream, the data link connection identifier (DLCI) or a frame address (FA) is related to a call reference number, which may be used to retrieve a VPI and a VCI from level one LUT translation RAM 508 to generate a unique address identifier in accordance with a preferred embodiment of the present invention. In the case of a synchronous data stream, the span line number and the subslot number is used to obtain a call reference number and to obtain a VPI and VCI from level one LUT translation RAM 508 in accordance with a preferred embodiment of the present invention. This address translation is a level one address translation and more information on level one address translations may be found in a pending patent application entitled "Virtual Path—Based Static Routing", filed Mar. 15, 1996 and assigned to the assignee of the present invention. Cell processor 505 multiplexes header, payload, and trailer information together to form a cell, which is stored in S/P buffer memory 506 for eventual transfer to BID 414 for transport within CBSC 502.

With reference now to FIG. 9, a flowchart of a process of synchronous and asynchronous uplink data stream processing by a frame to cell converter is illustrated according to the present invention. A determination (600) is made as to whether the data stream is a synchronous or asynchronous data stream. This determination is made by front-end processor 501, which is provisioned to recognize whether format of data on the T1/E1 is synchronous or asynchronous. Front-end processor 501 is implemented using standards found in ITU Specification Q.920/921 and using Lewis, Voice Frame Format, presented at Telecommunications Industry Association, TR46 Ad-Hoc Group, Monterey Calif., Aug. 28–Sep. 1, 1995, in accordance with a preferred embodiment of the present invention. If the data stream is a synchronous data stream, each subslot is buffered (602) into a separate shift register. Each subslot is buffered in a separate shift register within S/P shift registers 503 and written to buffer memory 504 when full. Thereafter, data is written (604) into a buffer memory when a shift register is full. A determination (606) is made as to whether an entire frame has been received and buffered. If an entire frame has not been received and buffered, the process returns to step 602, as shown. Otherwise, the process reads (608) data from the buffer memory.

Cell processor 505 reads data pertaining to sub-rate circuit identity (SCI) number from buffer memory 504 to begin formatting the outgoing (uplink) ATM cell. One piece of information read from buffer memory 504 is a control word that specifies the SCI number, although this may have been derived from the position in memory, as data for each SCI number is stored sequentially and is operated on by the cell processor 505 in sequence. The control word may also contain a fixed length indication which may also be inferred for synchronous, since it is fixed to 40 octets.

Then, header translation is performed (610). Cell assembly requires header translation (relating SCI to VPI/VCI, which is picked up in level one LUT translation RAM 508+HEC calculation). The process performs CRC-32 processing (612). The CRC-32 processing is performed by packet processor 502 on the payload. Finally, the SHO number of the particular link or call may be included in the AAL 5 trailer. Next, a cell is created (614) by multiplexing header, payload, and trailer information from the buffer memory 504, cell processor 505, and level one LUT control block 507. The multiplexing of information into cells is handled by level one LUT control block 507 in accordance with a preferred embodiment of the present invention. The cell is then stored (616) in a serial to a parallel (S/P) buffer memory 506. The cell is held within the S/P buffer memory 506 until access is granted to transfer the cell into the interface block 418. Access is arbitrated by a controller block within the interface block 418, which is not shown. The PPUs may share the interface block 418 via the shared bus. The process then transfers (618) the cell to a BID 414 via interface block 418 with the process terminating thereafter.

With reference again to step 600, if the data stream is an asynchronous data stream, the process then detects (620) start and stop flags within the data stream and extracts the PDU based on the start and stop flags. Front-end processor 501 is used to detect start/stop flags and extract a PDU from the data stream (e.g., header, payload, trailer). Thereafter, CRC-16 FCS processing is performed (622). Front-end processor 501 sends control and data signal to the packet processor 502 for calculation and comparison of CRC-16 FCS on the packet, per ITU Specification Q.921. A positive indication of a good packet is written into a control word, which may be buffered in buffer memory 504. The control word will also contain control-bits extracted from the packet header which are to be inserted into the outgoing ATM cell header. Serial to parallel (S/P) conversion is performed (624) with data being written into the buffer memory 504. Front-end processor 501 provides S/P conversion and writes payload words to buffer memory 504. During the cell assembly process, cell processor 505 reads (626) data pertaining to a particular call from buffer memory 504 to begin formatting the outgoing (uplink) ATM cell, after which time, AAL 5 processing is performed (628). A control word is read from buffer memory 504 to get the length of the packet (for padding and completing the AAL 5 trailer packet length octets). A determination (630) is then made as to whether the packet is valid. The control word is also read to see if the packet is valid per FCS checking in packet processor 502; if not, cell formatting is discontinued. Control-bits within the control word (from the packet header) are obtained and submitted to the header formatting block within the cell processor 505. If the packet is not valid, the routine is exited, as shown.

If the packet is found to be valid, header translation is performed (632). The control portion of the packet also contains the DLCI, which is used by the cell processor 505 to perform a level one look-up translation of DLCI to a VPI/VCI through level one LUT control block 507 accessing level one LUT translation RAM 508 to produce a unique address_identifier. Thereafter, CRC-32 processing is performed (634) within cell processor 505. The payload itself is submitted to a CRC-32 calculation within cell processor 505. Finally, a separate register may be accessed to obtain the particular SHO number of the cell for inclusion in the CPCS-UU octet of the AAL 5 trailer (not shown). After CRC-32 processing, a cell is created (636) by multiplexing header, payload, and trailer information together, with the processing then storing (616) the cell in a serial to parallel buffer memory and transferring (618) the cell to a BID for eventual distribution within the cell-based switching network. The cell is then multiplexed together (header, payload, trailer) by cell processor 505 and held within the S/P buffer memory 506 until access is granted to transfer the cell into the interface block 418. Access is arbitrated by a controller block within the interface block 418, which is not shown. A number of PPUs may share the interface block 418 (via the shared bus).

With reference now to FIG. 10, a block diagram of downlink components in a packet processing unit for processing cells for transmission in synchronous and asynchronous data streams is depicted according to the present invention. The components illustrated in FIG. 10 are similar to those shown in FIG. 8, except these components form a downlink unit in a PPU and perform inverse functions from those depicted in FIG. 8. PPU 700 is connected to interface block 418 and also has a connection to a LIU/framer 402 via multiplexing unit 404 (not shown in FIG. 8). As with PPU 500, PPU 700 includes a P/S buffer memory 706, which receives cells from buffer memory 710 in interface block 418. Cell address router 711 determines correct routing for cells as they enter interface block 418 and directs the cells to the appropriate PPU for processing. Level one LUT control block 707 performs an address translation using level one LUT translation RAM 708. If the data in the cells are destined for an asynchronous span line, the VPI and VCI are mapped or related to a DLCI or a FA in accordance with a preferred embodiment of the present invention. In the case of a synchronous span line being the destination for the data, the VPI and VCI in the cell header field are mapped or related to a span line channel number in accordance with a preferred embodiment of the present invention. The results are placed within buffer memory 703. Packet processor 705 performs CRC-16 FCS and assemblies PDUs for transport. Cell processor 704 performs a CRC-32 check and disassembles cells. Data from buffer memory 703 is sent to front-end processor 701 either directly or via P/S shift registers 702 to an LIU/framer. Each PPU has a connection to the LIU/framers 402 via multiplexing unit 404 shown in FIG. 7 in accordance with a preferred embodiment. A PPU may be connected to different LIU/framers 402 depending on what span line the outgoing data is to be transmitted.

With reference now to FIG. 11, a flowchart of a process for synchronous and asynchronous downlink data stream processing by a frame to cell converter is depicted according to the present invention. The cell is transferred from the BID 414 via a UTOPIA bus under control of the BID 414 to the interface block 418. The process begins by determining (800) whether the data stream is a synchronous or an asynchronous data stream. If the data stream is a synchronous data stream, the process then parses (802) the cell to determine the span line number and sends the data to an associated processor for processing. The cell is parsed by the interface block 418 to detect the span line number, which is part of the cell header address, and routed to the appropriate span line processor (e.g., PPU 700). Access is arbitrated by a controller block within the interface block 418, which is not shown. The PPUs may share the interface block 418 via a shared bus in accordance with a preferred embodiment of the present invention.

Thereafter, the cell is stored (804) in a parallel to serial (P/S) buffer with PPU 700 to begin the cell disassembly process. Address translation is performed and the results are stored in a buffer memory (806). Level one LUT control block 707 performs an address translation via level one LUT translation RAM 708 and the result is stored in cell processor 704. The address translation results are actually used to write the payload into the buffer memory 703 in specific locations, pertaining to the SCI address of the sub-rate channel number to simplify synchronous span line data multiplexing. No control bits are present from the ATM cell header for integration into the synchronous payload. Level one LUT translation RAM 708 may also contain provisioning information for the particular VC to indicate that it contains synchronous frame information. This specifies the valid length of the packet and instructs how the payload data is to be written into the buffer memory 703 to enable proper assembly of the synchronous payload. Since the payload is relative to a synchronous span line, no packet processing is required and packet processor 705 is unused for processing the payload. The length of the PDU required to transport the data is then determined (808). The length, however, is inferred, as the front-end processor 701 will be provisioned to operate on a synchronous span line, which will enable it to infer a particular sequence in reading data from the buffer memory 703 to fill the P/S shift registers 702 for multiplexing of each channel into an outgoing T1/E1 time division multiplexing (TDM) stream. Shift registers 702 may be implemented using a memory or other known shift register circuits, in accordance with a preferred embodiment of the present invention.

A determination of the packet-size is determined from the AAL 5 trailer by cell processor 704. A CRC-32 check is performed (810). to determine whether the cell is a valid cell or whether errors have occurred during the cell's transport As the cell payload is shifted through cell processor 704 a CRC-32 is performed and the result is written into the buffer memory 703. This result of the CRC-32 check is written into the control word to provide a positive indication that the packet payload is valid. Otherwise, operations are reset and an error-counter is incremented; the errored packet will still be transmitted within the subslot of a particular channel within the span line. Data is written (812) into the P/S shift registers 702. Thereafter, synchronous payload assembly is performed (814). Finally a data stream is created and sent out (816) on the span line.

With reference again to step 800, if the data stream is an asynchronous data stream, the cell is parsed (818) to determine the span line number and the associated processor. Thereafter, the cell is stored (820) in a P/S buffer memory. Address translation is performed (822) and the result is passed to the packet processor 705. Next, the length of the PDU required to transport the data is determined (824). The length of the packet payload is written into a control word to indicate the size of the PDU to be transferred from the buffer memory 703 into the front-end processor 701. CRC-16 FCS and CRC-32 operations are concurrently performed and the results are stored (826) in a buffer memory 703. The determination of the packet size and the address translation enable the packet trailer (CRC-16 FCS) to be formed concurrently with the cell AAL 5 CRC-32 check process, since both are serial operations. The result of the CRC-32 is written into the control word to provide a positive indication that the packet payload is valid. Otherwise, operations are reset and an error-counter is incremented. Finally, the length of the packet payload is written into a control word to indicate the size of the PDU to be transferred from buffer memory 703 into front-end processor 701. The CRC-16 is also passed through buffer memory 703 from packet processor 705 into front-end processor 701 to be integrated into the packet trailer. A PDU is created (828) from the data in the buffer memory 703 and a data stream is created (816) from the PDUs. Front-end processor 701 performs packet assembly by reading appropriate control, address, payload, and trailer information from the buffer memory 703. The resulting header, payload, and trailer are multiplexed together and are shifted out to the LIU/framer 402 in sequence.

Thus, the present invention provides an improved method and apparatus for handling both asynchronous data streams and synchronous data streams by providing a PPU that contains common hardware to process both types of streams. A number of these PPUs form part of a packet processing engine and are used in a frame to cell converter to receive data streams in a CBSC. Additionally, the present invention provides an improved method and apparatus for processing data streams by employing a frame to cell converter that reduces congestion by multiplexing packets from a number of different span lines into a packet processing engine to provide a generation of cells from the data streams at increased rates.

Thus, the present invention reduces the delay in voice data transmission through simplified processing that is optimized for air interface capacities. Additionally, the present invention does not rely on PCI based architectures, resulting in a lower cost to implement. Additionally, the present invention provides a common site for performing an address translation to produce a unique identifier for a data stream that is mapped to a VPI and VCI in a cell.

What is claimed is:

1. In a data communications system controller, a method of converting a data transmission stream for transportation in a cell-based network, the method comprising the steps of:

receiving the data transmission stream from a data source to produce a received data transmission stream;

performing an address translation based on the data source to produce a unique address identifier; and using the unique address identifier and a portion of the received data transmission stream to create a data cell unit for transportation within the cell-based network, wherein the data transmission stream includes a data link connection identifier identifying the data source and is associated with a span line number, and further wherein the step of performing an address translation based on the data source comprises mapping a virtual path identifier to the span line number and a virtual channel identifier to the data link connection identifier.

2. The method of claim 1, wherein the step of receiving the data transmission stream comprises receiving a data stream of type FUNI.

3. The method of claim 1, wherein the step of receiving the data transmission stream comprises receiving a CDMA-compatible data stream from a data source that is CDMA compatible.

4. The method of claim 1, wherein the step of receiving the data transmission stream comprises receiving an asynchronous data stream.

5. The method of claim 1, wherein the step of receiving the data transmission stream comprises receiving a synchronous data stream.

6. An apparatus comprising:

an interface, wherein the interface is coupled to receive a data stream from a data source;

a processing unit coupled to the interface, wherein the processing unit performs an address translation based on the data source to produce a unique address identifier, creates a cell having a header and a payload, and places the unique address identifier in the header and a portion of the data stream into the payload; and a bus interface device coupled to the processing unit and a bus, wherein the bus interface device places cells created by the processing unit onto the bus for transport within a cell-based network, wherein the data transmission stream includes a data link connection identifier identifying the data source and is associated with a span line number, and further wherein the processing unit performs the address translation by mapping a virtual path identifier to the span line number, and mapping a virtual channel identifier to the data link connection identifier.

7. The apparatus of claim 6, wherein the processing unit includes at least one packet processing unit and a microprocessor unit.

8. The apparatus of claim 6, wherein the data stream received by the interface is a data stream of type FUNI.

9. The apparatus of claim 6, wherein the data stream received by the interface is a data stream of type frame relay.

10. The apparatus of claim 6, wherein the data source is a base termination site that is adapted to be connected to the interface by a span line.

11. A frame to cell converter for processing a plurality of packet data units comprising:

a plurality of line interface blocks, each of the line interface blocks being adapted to be connected to a plurality of span lines, each of the plurality of span lines being connected to a base termination site, wherein the plurality of line interface blocks receive data packet units asynchronously and synchronously;

a multiplexing unit connected to the plurality of line interface blocks, wherein the multiplexing unit de-multiplexes packet data units received from the plurality of span lines, verifies whether each of the plurality of packet data units is error free, and associates data from each packet data unit with a data link connection identifier and a span line number; and a packet processing engine connected to the multiplexing unit, wherein the packet processing engine receives the data, the data link connection identifier and the span line number associated with the data from the multiplexing unit, performs an address translation using the data link connection identifier and the span line number to associate a virtual path identifier and a virtual channel identifier with the data, and creates a cell utilizing the virtual path identifier and the virtual channel identifier.

12. The frame to cell converter of claim 11, wherein the cell includes a header portion and a payload portion and the virtual path identifier and the virtual channel identifier are placed within the header portion and the data is placed in the payload portion.

13. The frame to cell converter of claim 11, wherein the packet processing engine includes a plurality of packet processing units.

14. A frame to cell converter for converting both asynchronous data streams and synchronous data streams into cells for transport in a cell-based network comprising:

a line interface block adapted to be coupled to a plurality of span lines, wherein each span line within a first portion of the plurality of span lines carries a synchronous data stream and each span line within a second portion of the plurality of span lines carries an asynchronous data stream, the asynchronous data stream and the synchronous data stream both including a plurality of packet data units; and a plurality of packet processing units coupled to receive data from the line interface block and wherein each of the packet processing units is adapted to process both data from asynchronous data streams and synchronous data streams to create cells, each packet data unit including a data link connection identifier that identifies a source for the data and is associated with a span line number, each of the packet processing units being adapted to perform an address translation by mapping a virtual path identifier to the span line number and mapping a virtual channel identifier to the data link connection identifier, wherein the virtual channel identifier and the virtual path identifier are placed within a header in a cell and the data is placed within a payload in the cell.

15. The frame to cell converter of claim 14, wherein the plurality of packet processing units are coupled to the line interface block by a multiplexing unit having an input coupled to the line interface block and an output coupled to at least one of the plurality of packet processing units, wherein the multiplexing unit demultiplexes packet data units within a data stream received from the plurality of span lines, verifies each of the plurality of packet data units, and associates the data from each packet data unit with a data link connection identifier.

16. The frame to cell converter of claim 14, wherein each packet data unit includes an identifier that identifies a source of a packet data unit, within the plurality of packet data units and each packet processing unit performs an address translation using the identifier to associate a virtual path identifier and a virtual channel identifier with the data in the packet data unit.

17. A communications system comprising:
a plurality of base termination sites for receiving radio signals;
a plurality of span lines, each span line within the plurality of span lines having a first end and a second end, the first end being connected a base termination site within the plurality of base termination sites;
a cell-based network having an interface for converting both synchronous data streams and asynchronous data streams into cells for transport in the cell-based network, the interface comprising:
  a line interface unit adapted to be connected to the second end of each span line within the plurality of span lines, wherein each span line within a first portion of the plurality of span lines carries a synchronous data stream and each span line within a second portion of the plurality of span lines carries an asynchronous data stream;
  a packet processing engine connected to the line interface unit, wherein the packet processing engine includes a plurality of packet processing unit for receiving a data stream from the line interface unit and wherein each of the packet processing units within the plurality of packet processing units comprises:
    an uplink unit, the uplink unit receiving both synchronous data streams and asynchronous data streams and converting the synchronous data streams and the asynchronous data streams into cells for transport within the cell-based network; and
    a downlink unit, the downlink unit receiving cells from the cell-based network and converting the cells into synchronous data streams and asynchronous data streams for transport on the first portion of the plurality of span lines and the second portion of the plurality of span lines.

18. The communications system of claim 17, wherein the uplink unit includes an uplink unit having a first front-end processor with an input for a data stream from the line interface unit, wherein the first front-end processor identifies the data stream from the line interface unit; a first shift register unit for receiving a synchronous data stream, forming a received synchronous data stream, and storing data from the received synchronous data stream; a first buffer memory for storing data from the data stream; a first packet processor for receiving data packet units in an asynchronous data stream, forming a received synchronous data stream, and storing data from the packet data units in the first buffer memory; and a first cell processor for creating cells from the data in the first buffer memory.

19. The communications system of claim 17, wherein the downlink unit includes an input to receive cells from the cell-based network; a second cell processor for disassembling cells and generating information for a data stream; a packet processing unit for generating packet data units for transport in an asynchronous data stream; a second buffer memory for storing data used to generate a synchronous data stream and for storing data for generating an asynchronous data stream; a second shift register unit for receiving data from the second buffer memory for use in creating a synchronous data stream; and a second front-end processor, wherein the second front-end processor generates a synchronous data stream from the data stored in the second shift register unit in response to an indication that a synchronous data stream is to be generated and generates an asynchronous data stream from the data stored in the second buffer memory in response to an indication that an asynchronous data stream is to be generated.

20. An apparatus for converting both synchronous data streams and asynchronous data streams into cells for transport in a cell-based network comprising:
a line interface unit adapted to be connected to a plurality of span lines, wherein each span line within a first portion of the plurality of span lines carries a synchronous data stream and each span line within a second portion of the plurality of span lines carries an asynchronous data stream;
a packet processing engine connected to the line interface unit, wherein the packet processing engine includes a plurality of packet processing unit for receiving a data stream from the line interface unit and wherein each of the packet processing units within the plurality of packet processing units comprises:
  an uplink unit having a first front-end processor with an input for a data stream from the line interface unit, wherein the first front-end processor identifies the data stream from the line interface unit; a first shift register unit, connected to the first front-end processor, for receiving a synchronous data stream, forming a received synchronous data stream, and storing data from the received synchronous data stream; a first buffer memory, connected to the first front-end processor and to the first shift register unit, for storing data received from the first front-end processor and the first shift register unit; a first packet processor, having an input connected to the first front-end processor and an output connected to the first buffer memory, for receiving data packet units in an asynchronous data stream and storing data from the packet data units in the first buffer memory; and a first cell processor, connected to the first buffer memory, for creating cells for transport within the cell-based network from the data in the first buffer memory; and a downlink unit having an input to receive cells from the cell-based network; a second cell processor, connected to the input, for disassembling cells and generating information for a data stream; a second packet processing unit, connected to the input, for generating packet data units for transport in an asynchronous data stream; a second buffer memory, connected to the second cell processor and the second packet processor, for storing data used to generate a synchronous data stream and for storing data for generating an asynchronous data stream; a second shift register unit, connected to the second buffer memory, for receiving data from the second buffer memory for use in creating a synchronous data stream; a second front-end processor, connected to the second buffer memory and the second shift register unit, wherein the second front-end processor generates a synchronous data stream from the data stored in the second shift register unit in response to an indication that a synchronous data stream is to be generated and generates an asynchronous data stream from the data stored in the second buffer memory in response to an indication that an asynchronous data stream is to be generated.

21. The apparatus of claim 20, wherein the uplink unit further comprises an address translation means for performing an address translation based on the data stream to produce a unique address identifier, wherein the unique address identifier and a portion of the data stream are used to create a cell for transportation within the cell-based network.

22. The apparatus of claim 21, wherein the data stream includes a data link connection identifier identifying a data source and is associated with a span line number, wherein the address translation means includes means for mapping a virtual path identifier to the span line number and a virtual channel identifier to the data link connection identifier.

* * * * *